(12) United States Patent
Yokoyama (10) Patent No.: US 9,243,684 B2
(45) Date of Patent: Jan. 26, 2016

(54) CHAIN

(71) Applicant: TSUBAKIMOTO CHAIN CO., Osaka-shi, Osaka (JP)

(72) Inventor: Masanori Yokoyama, Osaka (JP)

(73) Assignee: TSUBAKIMOTO CHAIN CO., Osaka-shi (JP)

(*) Notice: Subject to any disclaimer, the term of this patent is extended or adjusted under 35 U.S.C. 154(b) by 246 days.

(21) Appl. No.: 14/079,762

(22) Filed: Nov. 14, 2013

(65) Prior Publication Data
US 2014/0141913 A1   May 22, 2014

(30) Foreign Application Priority Data

Nov. 21, 2012 (JP) .................................. 2012-255611

(51) Int. Cl.
*F16G 13/06* (2006.01)
*F16G 13/18* (2006.01)

(52) U.S. Cl.
CPC ................ *F16G 13/06* (2013.01); *F16G 13/18* (2013.01)

(58) Field of Classification Search
CPC ......... F16G 13/02; F16G 13/04; F16G 13/06; F16G 13/07; F16G 13/18; F16G 5/18
USPC .................................................. 474/206, 226
See application file for complete search history.

(56) References Cited

U.S. PATENT DOCUMENTS

| 3,439,494 | A | * | 4/1969 | Gettmann | ............... | F16G 13/06 474/226 |
| 3,608,499 | A | * | 9/1971 | Krammer | ................. | F16G 13/06 104/172.5 |
| 3,844,221 | A | * | 10/1974 | Fromme | ................. | F16G 13/12 104/172.5 |
| 4,570,436 | A | * | 2/1986 | Wilkie | .................... | B21L 9/065 59/4 |
| 4,636,181 | A | * | 1/1987 | Savolainen | ............ | B65G 17/38 198/850 |
| 4,750,325 | A | * | 6/1988 | Messier | ................. | B65G 19/20 198/731 |
| RE32,941 | E | * | 6/1989 | Newton | ................... | F16G 13/02 474/206 |
| 5,226,855 | A | * | 7/1993 | Van Lierde | ........... | B61B 10/043 104/172.2 |
| 5,520,585 | A | * | 5/1996 | Green | ....................... | F16G 1/22 474/206 |
| 5,966,923 | A | * | 10/1999 | Nakamura | ............. | B65G 17/38 198/851 |
| 6,364,799 | B1 | * | 4/2002 | Campagnolo | ........... | F16G 13/06 474/206 |
| 7,726,469 | B2 | * | 6/2010 | Frost | ...................... | B65G 17/38 198/850 |
| 2002/0123404 | A1 | * | 9/2002 | Okabe | ..................... | F16G 13/04 474/212 |
| 2008/0026896 | A1 | * | 1/2008 | Curran | .................... | F16G 13/06 474/206 |
| 2014/0057750 | A1 | * | 2/2014 | Yokoyama | ............. | F16G 13/06 474/206 |
| 2015/0051035 | A1 | * | 2/2015 | Wilbur | .................... | F16G 13/06 474/231 |

FOREIGN PATENT DOCUMENTS

JP          2-10848  Y2    3/1990

\* cited by examiner

*Primary Examiner* — William E Dondero
*Assistant Examiner* — Robert T Reese
(74) *Attorney, Agent, or Firm* — Westerman, Hattori, Daniels & Adrian, LLP (57) ABSTRACT

A chain is provided, whose strength is increased and whose power loss is reduced as a result of reduced friction resistance between link units and link plates. A pair of link plates 160 are pivotally coupled to a link unit 101 in the chain 100. A pair of connecting pin portions 110 and a pair of plate portions 140 are inseparably joined at joint parts 150 to form one link unit 101. A stopper portion 123 is provided to the connecting pin portion 110 between a plate portion 140 and a link plate 160 adjacent each other in the width direction to restrict the link plate 160 from coming closer to the plate portion 140.

4 Claims, 5 Drawing Sheets

Fig. 4 and the power loss of the chain is reduced.

CHAIN

BACKGROUND OF THE INVENTION

1. Field of the Invention

The present invention relates to a chain formed by a plurality of inner links and outer links coupled together alternately and pivotally in the longitudinal direction and placed over a sprocket. The chain is used as a transmission chain, for example.

2. Description of the Related Art

Chains that are placed over a sprocket are generally formed by a plurality of inner links and outer links. The inner link has a pair of inner link plates and a pair of bushings press-fitted in the link plates. The outer link has a pair of outer link plates and a pair of connecting pins press-fitted in the link plates. The connecting pins of each outer link are loosely fitted in the bushings of each inner link so that the inner links and the outer links are alternately and pivotally coupled together in the longitudinal direction of the chain (hereinafter referred to as "longitudinal direction").

One known chain uses inner links that are formed as a single piece component to include a pair of inner link plates and a pair of bushings by a single piece forming process (for example, second to fourth columns and drawings of Japanese Examined Utility Model Application Publication No. H2-10848).

The pair of bushings of the inner links of the conventional chain cause the tensile force to be applied as pressing force to a pair of non-facing portions of the inner link plates that are opposite from the pair of facing portions where the link plates face each other in the longitudinal direction.

In the inner link plates, therefore, tensile stress is concentrated (hereinafter, "concentrated tensile stress") in portions surrounding the respective bushings, at boundary portions around the boundaries between the facing region, which is an area between a pair of facing portions facing each other in the longitudinal direction, and the non-facing region, which is an area between the pair of non-facing portions in the longitudinal direction.

Such concentrated tensile stress repeatedly generated as a result of fluctuation of tensile force decreases the fatigue strength of the inner link plates and lowers the durability of the chain.

The applicants of the present invention have proposed a chain formed by coupling together link units and pairs of link plates alternately in the longitudinal direction, the link units each having a pair of connecting pin portions and a pair of plate portions integrally joined together at joint parts, and the pairs of link plates each being coupled to the connecting pin portions such as to be pivotable around a pivot center line.

In the proposed chain, the pair of connecting pin portions apply the tensile force as pulling force to the respective plate portions via the joint parts located in facing portions facing each other in the longitudinal direction, so that the concentration of tensile stress in conventional chains is prevented, and the chain can have improved durability as a result of increased fatigue strength of the plate portions.

One problem in the proposed chain is that, as the link units and link plates can pivot around the pivot center line relative to each other, if plate portions and link plates adjacent each other in the width direction of the chain contact each other in a large area, the friction resistance is accordingly large as the link units and link plates slide on each other when the chain bends, so that power loss in the chain is increased.

SUMMARY OF THE INVENTION

The present invention is directed to solve the problem described above and an object of the invention is to provide a chain with increased strength, and less power loss as a result of reduced friction resistance between link units and link plates.

To solve the above problem, the present invention provides a chain formed by inner links and outer links coupled together alternately and pivotally in a longitudinal direction and placed over a sprocket, the inner links each being formed as a link unit having a pair of connecting pin portions spaced apart in the longitudinal direction and a pair of plate portions coupling the pair of connecting pin portions and spaced apart in a width direction, the plate portions coupling together the pair of connecting pin portions at a pair of joint parts where the pair of connecting pin portions and the plate portions are inseparably joined together, the outer links each being formed by a pair of link plates, the pair of link plates sandwiching the pair of plate portions in the width direction and each being pivotally coupled to a pair of support portions of the connecting pin portions, and a stopper portion being provided that is located within a range in the width direction between an adjoining plate portion and an adjoining link plate that are a plate portion and a link plate adjoining each other in the width direction, to provide restriction to stop the adjoining link plate from coming closer to the adjoining plate portion, so that there is formed a gap in the width direction between facing portions of the adjoining plate portion and the adjoining link plate facing each other in the width direction.

In the chain according to claim 1 of the present invention, the inner links each are formed as a link unit having a pair of connecting pin portions spaced apart in a longitudinal direction of the chain and a pair of plate portions coupling the pair of connecting pin portions and spaced apart in a width direction of the chain, the pair of connecting pin portions and the pair of plate portions being inseparably joined at pairs of joint parts, and the outer links each are formed by a pair of link plates, so that the inner links have higher strength as they are formed as a simple structured link unit, whereby the durability of the chain is improved.

To assemble the chain, it is only necessary to couple a pair of link plates pivotally to a link unit, which is a single component having a pair of connecting pin portions and a pair of plate portions integrally formed, so that, as compared to conventional chains formed by press-fitting a pair of connecting pins to a pair of outer link plates, the chain can be assembled more easily, and the improved ease of assembly enables cost reduction.

Since the link plates are coupled to the connecting pin portions that are integral with the plate portions, the link unit and a pair of link plates are coupled together with a fewer number of components as compared to conventional chains that require connecting pins and bushings, which also contributes to cost reduction.

A stopper portion is provided, which is located within a range in the width direction between an adjoining plate portion and an adjoining link plate that are the plate portion and the link plate adjoining each other in the width direction, to establish a restriction state of restricting the adjoining link plate from coming closer to the adjoining plate portion. A gap is formed in the width direction between facing portions of the adjoining plate portion and the adjoining link plate facing and restricted from each other in the width direction. The stopper portion thus restricts contact between the adjoining plate portion and the adjoining link plate, so that the contact area between the link unit and the link plate is reduced as compared to a case where there is no stopper portion. Therefore, friction resistance between the link units and link plates that are pivotable around the pivot center line relative to each other and slide on each other when the chain bends is reduced, which in turn reduces the power loss in the chain when it is running by the power generated by the power source. The power transmission performance of the chain can thus be improved.

In the chain according to claim 2 of the present invention, first meshing spaces surrounded by the pairs of connecting pin portions and the pairs of plate portions of the link units, and second meshing spaces surrounded by the connecting pin portions of the link units adjacent each other in the longitudinal direction and the pairs of link plates, are alternately formed in the longitudinal direction. A plurality of sprocket teeth of the sprocket can enter consecutively the first meshing spaces and second meshing spaces respectively. With the chain meshing with the sprocket, as the sprocket rotates, the sprocket teeth enter the first and second meshing spaces. When power is transmitted between the chain and the sprocket, the power transmission occurs between the chain and sprocket teeth through the link units of the chain, where the connecting pin portions and the plate portions are inseparably joined so that there is no gap between the connecting pin portions and plate portions. Due to this configuration, no relative displacement is generated between these components, and thus the generation of noise resulting from such relative displacement is prevented and the chain can exhibit improved low noise performance.

The pair of connecting pin portions have a pair of facing portions facing each other in the longitudinal direction and a pair of non-facing portions opposite from the pair of facing portions in the longitudinal direction, and the connecting pin portions apply the tensile force to the plate portions via the pairs of joint parts each located in the pair of facing portions. The tensile stress generated in part of the plate portions surrounding the connecting pin portions is dispersed over the joint parts, which prevents stress concentration at a boundary portion around the boundary between the facing region and a non-facing region that is an area between the pair of non-facing portions in the longitudinal direction. The plate portions of the link units can thus exhibit improved fatigue strength, whereby the durability of the link units and consequently the durability of the chain are improved.

In the chain according to claim 3 of the present invention, the stopper portion is part of the connecting pin portion. The link plates are loosely fitted on the support portions that are passed through pin holes of the link plates. The stopper portion has an outer diameter larger than the hole diameter of the pin holes. The plate portion is located within a range in a height direction of the stopper portion. Therefore, even if the adjoining link plate has a greater plate height than that of the plate portion, an amount of offset of the stopper portion, which is an element that contributes to restrict contact between the adjoining plate portion and the adjoining link plate when the adjoining link plate loosely fitted on the support portions is tilted around an axis in the longitudinal direction, can be made small such as to protrude in a small amount in the width direction from the adjoining plate portion. Thus the chain can be made small in the width direction.

In the chain according to claim 4 of the present invention, the connecting pin portion includes a large-diameter part continuous in the width direction and a pair of small-diameter parts on both sides of the large-diameter part in the width direction with a smaller outer diameter than the outer diameter of the large-diameter part. The large-diameter part forms the stopper portion and a meshing portion located between the pair of plate portions in the width direction to be able to mesh with the sprocket teeth, while the small-diameter parts each form the respective support portions. The joint parts range over the stopper portion and the meshing portion.

Therefore, in the connecting pin portion formed by the large-diameter part and the small-diameter parts, as the joint parts are formed to range over the meshing portion and the stopper portion that are formed by the large-diameter part, the meshing portion can have higher rigidity, as it is formed by the large-diameter part, as well as the tensile stress at the joint parts can be reduced as they are formed over a large area. Thus the fatigue strength of the link units can be increased.

DESCRIPTION OF THE PREFERRED EMBODIMENTS

The chain according to the present invention may be embodied in any specific form as long as it is formed by a plurality of inner links and outer links alternately and pivotally coupled together in a longitudinal direction and placed over a sprocket, the inner links each being formed as a link unit having a pair of connecting pin portions spaced apart in the longitudinal direction and a pair of plate portions coupling the pair of connecting pin portions and spaced apart in a width direction, the plate portions coupling together the pair of connecting pin portions at a pair of joint parts where the pair of connecting pin portions and the plate portions are inseparably joined together, the outer links each being formed by a pair of link plates, the pair of link plates sandwiching the pair of plate portions in the width direction and each being pivotally coupled to a pair of support portions of the connecting pin portions, and a stopper portion being provided that is located within a range in the width direction between an adjoining plate portion and an adjoining link plate that are a plate portion and a link plate adjoining each other in the width direction to provide restriction to stop the adjoining link plate from coming closer to the adjoining plate portion, so that there is formed a gap in the width direction between facing portions of the adjoining plate portion and the adjoining link plate facing each other in the width direction, so that the chain strength is increased, and power loss is reduced as a result of reduced friction resistance between the link units and the link plates.

For example, in the link unit of the chain of the present invention, the joining means for joining the connecting pin portions and the plate portions may be any of single piece forming, fusing (or welding), and bonding.

The link unit of the chain of the present invention may be made of any of synthetic resin (hereinafter, "resin"), metal, or a combination of resin and metal (such as a resin product with an insertion-molded metal piece).

If the link unit is to be made of resin, it may be formed from two different resins for the connecting pin portions and the plate portions so that they have two different colors.

The resin may be fiber-reinforced resin reinforced with fibers.

If the link unit is to be made of metal, the single piece forming process may be any of casting, plastic forming (such as forging), and machining.

The stopper portion in the chain of the present invention may be provided to any of the connecting pin portion, plate portion, and link plate.

The chain of the present invention is a chain that is subjected to a tensile force when running, and may be used as a transmission chain (such as a timing chain) or a conveyor chain, for example, in any machines such as, for example, power transmissions of vehicles (including engines), conveyor machines, and industrial machines.

Embodiments

Hereinafter, embodiments of the present invention will be described with reference to FIG. 1 to FIG. 5.

Figure 1:
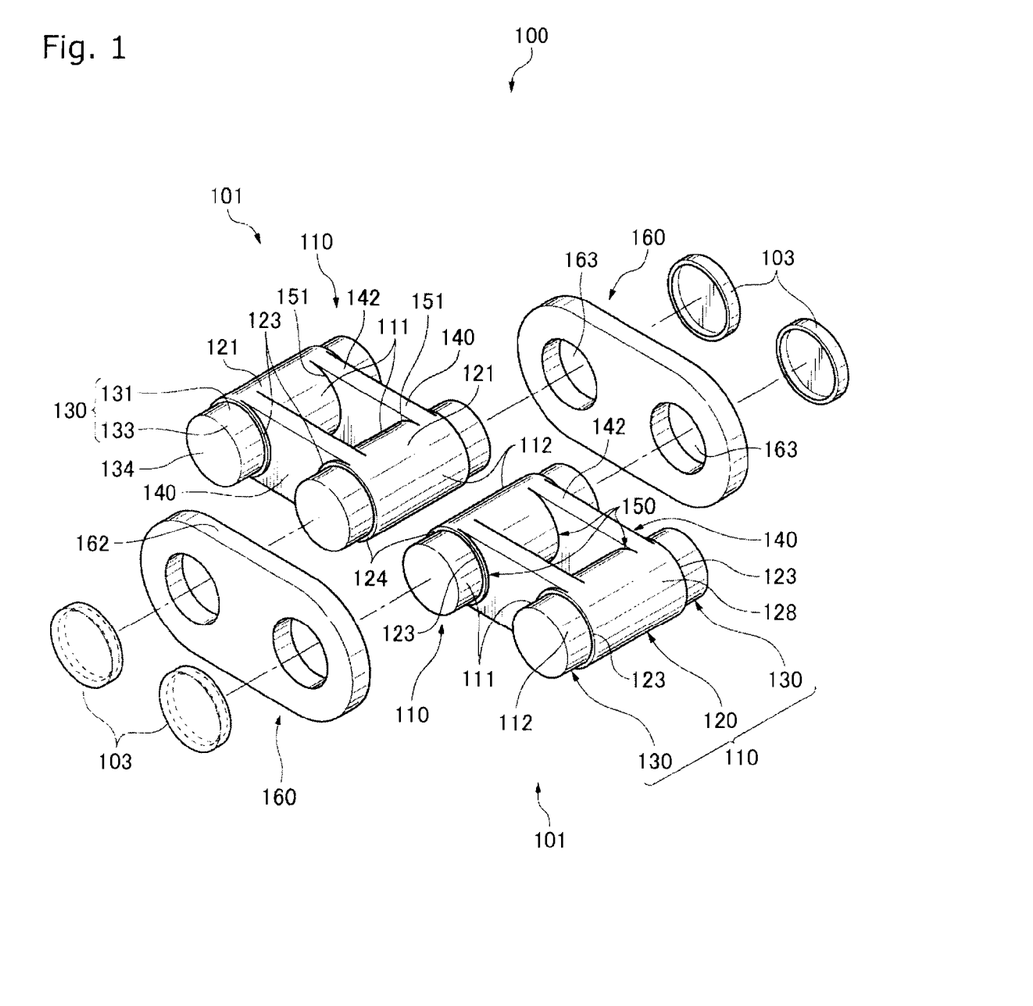
FIG. 1 is an exploded perspective view of part of a chain, illustrating one embodiment of the present invention.
Figure 2:
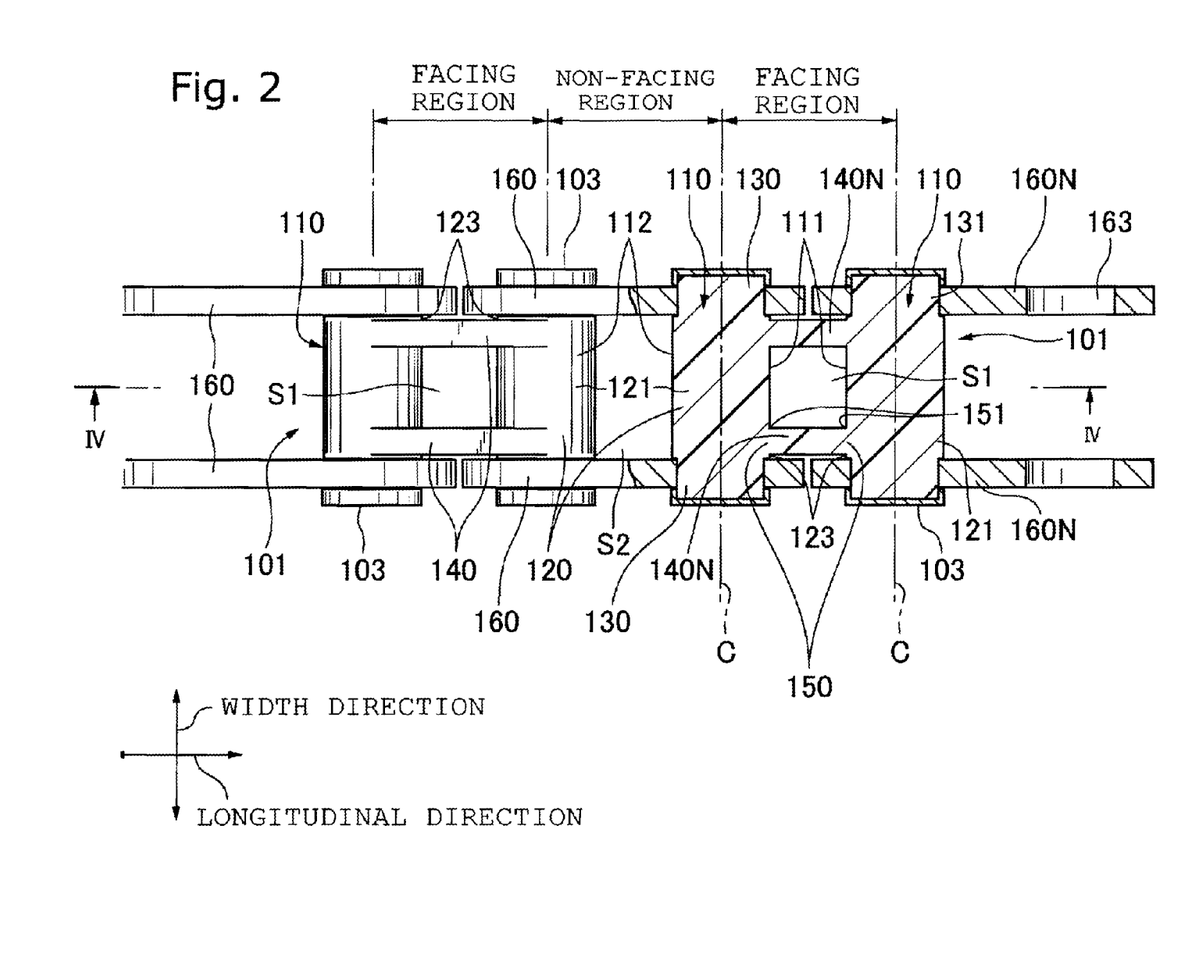
FIG. 2 shows essential parts of the chain of FIG. 1 viewed from a height direction, where some of the components are omitted, and some parts are shown in a cross section along the line II-II of FIG. 4.
Figure 4:
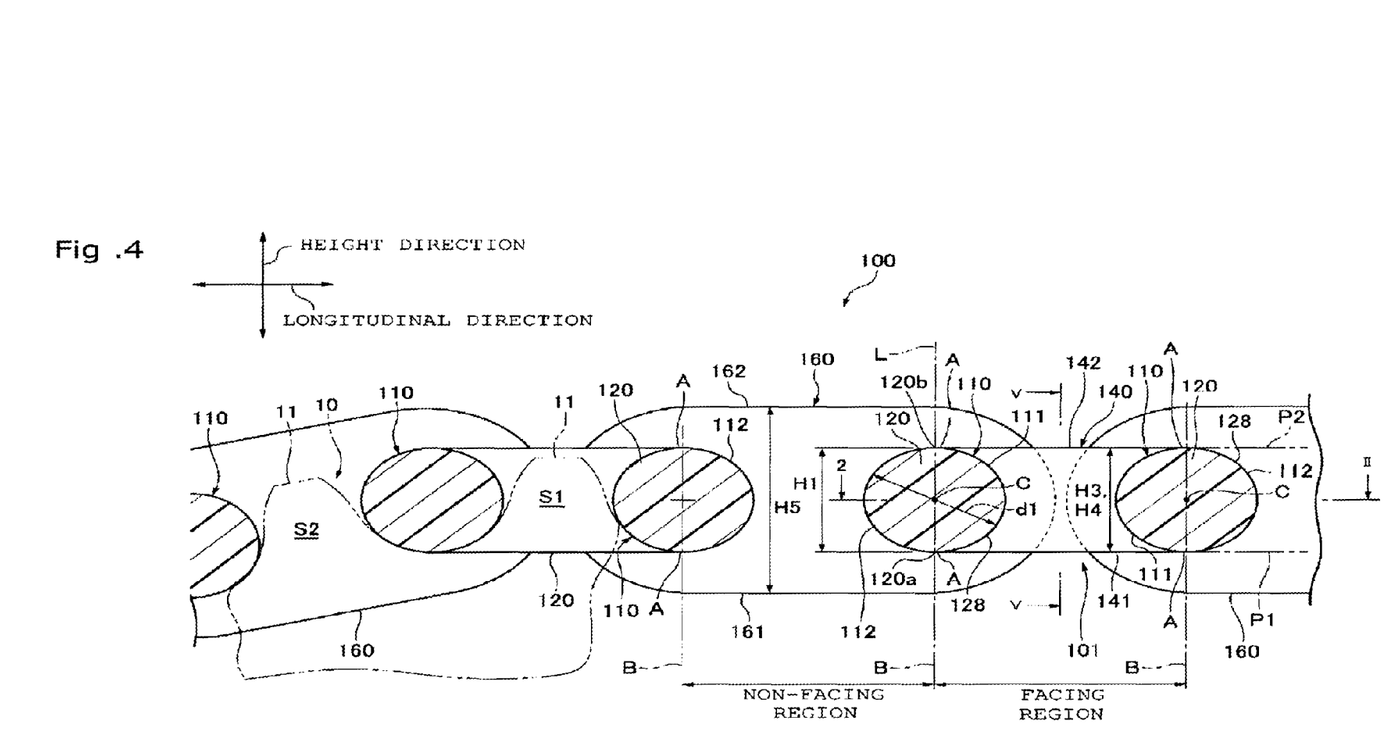
FIG. 4 is a cross-sectional view of essential parts along the line IV-IV of FIG. 2.

Referring to FIG. 1, FIG. 2, and FIG. 4, in one embodiment of the present invention, the chain 100 as a transmission chain is an endless chain made up of a plurality of link units 101 that form inner links, a plurality of pairs of link plates 160 that form outer links. Each link unit 101 is coupled to each pair of link plates 160 by connecting pin portions 110 (hereinafter, "pin portion 110") of the link unit 101 so that all the link units 101 and all the pairs of link plates 160 are connected alternately in the longitudinal direction such as to be pivotable around a pivot center line C of the pin portions 110.

The chain 100 forms a chain transmission device, with a sprocket mechanism having a plurality of sprockets 10 (one of which is shown in FIG. 4) for the chain 100 to pass over, and a chain guide 20 (see FIG. 5) for guiding the chain 100 that runs in the longitudinal direction.

The chain 100 moves when driven by a drive sprocket, which is one of the plurality of sprockets 10.

The chain guide 20 in sliding contact with the running chain 100 prevents the chain 100 from moving in a height direction and in a width direction.

The longitudinal direction is a direction in which the chain 100 extends, while the width direction is a direction parallel to the pivot center line C.

The height direction is a direction orthogonal to the longitudinal direction and the width direction of the chain 100 laid out straight. Put differently, it is a direction orthogonal to a plane containing a pair of pivot center lines C that are adjacent each other in the longitudinal direction of the link unit 101.

The link unit 101 is a single component made up of a pair of pin portions 110 spaced apart in the longitudinal direction, and a pair of plate portions 140 each coupling together the pair of pin portions 110 and spaced apart in the width direction.

The pair of pin portions 110 and the respective planar plate portions 140 are joined together by single piece forming as joining means, thereby forming the link unit 101.

The pair of pin portions 110 are inseparably joined to each plate portion 140 at a pair of joint parts 150, while each plate portion 140 couples together the pair of pin portions 110 only at the pair of joint parts 150.

"Inseparably joined" here means that, under the tensile force applied to the moving chain 100, the pair of pin portions 110 do not separate from the respective plate portions 140 at the joint parts 150, so that the tension applied to the pin portions 110 and the plate portion 140 is conveyed between both portions 110 and 140 via the joint parts 150.

In other words, the link unit 101 is a single piece component including a pair of pin portions 110 and a pair of plate portions 140 made of a single type of resin that is the constituent material.

The pair of pin portions 110 have the same shape, and the pair of plate portions 140 have the same shape.

The joint part 150 is a region apparently surrounded by frame-like joint boundaries 151 formed by the inseparably joined pin portions 110 and plate portions 140 of the link unit 101.

As the link unit 101 is formed by single piece forming in this embodiment, the joint part 150 is the entire region including the joint boundaries 151.

In an alternative embodiment, the joint part 150 may be only part of that region.

Figure 3:
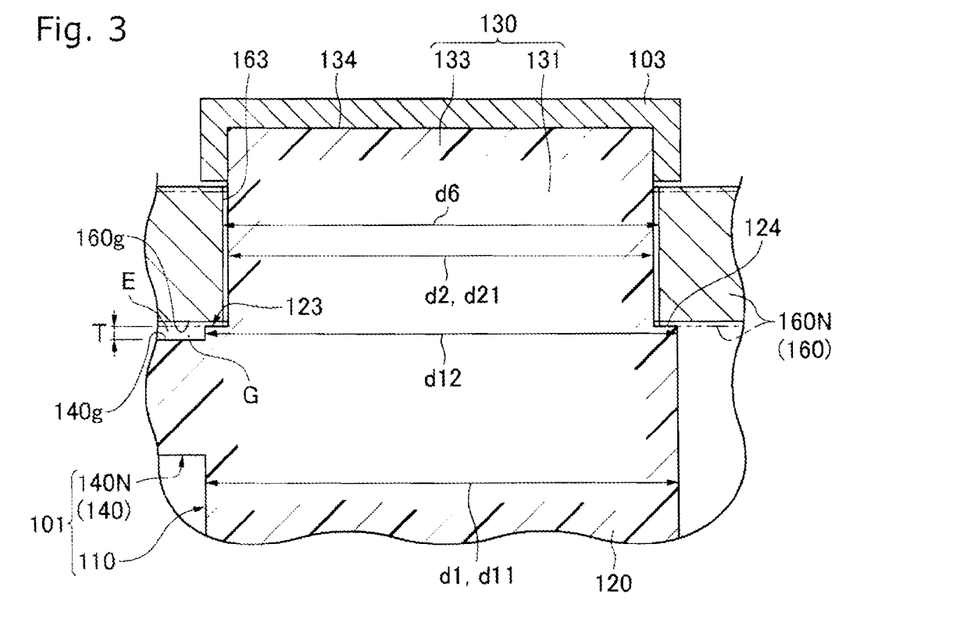
FIG. 3 is an enlarged view of essential parts of FIG. 2.

With reference also to FIG. 3, the pin portion 110 is a stepped columnar component having a large-diameter part 120 as a first pin portion continuous in the width direction, and a pair of small-diameter parts 130 as second pin portions located on both sides of the large-diameter part 120 in the width direction and having a different diameter from the outer diameter d1 of the large-diameter part 120, here, a smaller outer diameter d2 than the outer diameter d1.

The large-diameter part 120 having the same outer diameter d1 over the entire length in the width direction forms a meshing portion 121 with an outer diameter d11 and a pair of stopper portions 123 with an outer diameter d12.

In this embodiment, both outer diameters d11 and d12 are equal to the outer diameter d1. The joint parts 150 are present only in the large-diameter part 120.

The small-diameter parts 130 having the same outer diameter d2 over the entire length in the width direction each form a support portion 131 with an outer diameter d21 that is equal to the outer diameter d2 and a pin end 133.

The meshing portion 121 is a portion of the large-diameter part 120 between the pair of plate portions 140 in the width direction, and it is a transmitting part for transmitting power to and from the sprocket 10.

The meshing portion 121 can mesh with a plurality of sprocket teeth 11 (see FIG. 6) of the sprocket 10 to directly transmit power to and from the sprocket teeth 11.

Referring to FIG. 1 to FIG. 3 and FIG. 5, the stopper portions 123 are portions provided as part of the pin portions 110 in the link unit 101, which each protrude on the opposite side of the meshing portion 121 from the pair of plate portions 140 in the width direction.

The stopper portion 123 is located inside a range E in the width direction (FIG. 3) between an adjoining plate portion 140N and an adjoining link plate 160N, which are the plate portion 140 and the link plate 160 adjoining the stopper portion 123 in the width direction.

The range E in the width direction is a maximum distance in the width direction between the adjoining plate portion 140N and adjoining link plate 160N.

The stopper portion 123 abuts on the adjoining link plate 160N in the width direction, thereby providing restriction to stop the adjoining link plate 160N from coming closer to the adjoining plate portion 140N in the width direction.

In FIG. 3, the adjoining link plate 160N as it is restricted is indicated by a two-dot chain line.

The stopper portion 123 has an outer diameter d12 that is larger than the hole diameter d6 of the pin hole 163 to be described later of the link plate 160, and protrudes radially more than the small-diameter part 130, so that it is stepped in the radial direction from the support portion 131 all around the support portion 131.

Therefore, the stopper portion 123 has an annular radial stepped surface 124 entirely surrounding the circumference of the small-diameter part 130.

The stepped surface 124 is offset in the width direction with an amount T from the plate portion 140.

When the adjoining link plate 160N abuts on and is stopped by the stepped surface 124, there is formed a gap G in the width direction (FIG. 3) between the facing portions 140g and 160g of the adjoining plate portion 140N and the adjoining link plate 160N facing each other in the width direction.

The stepped surface 124 which the adjoining link plate 160N can abut on in the width direction has an area that is smaller than that of the facing portions 140g and 160g.

The small-diameter part 130 is a protruding part protruding to the opposite side of the meshing portion 121 in the width direction from the stopper portion 123, and has a support portion 131 closer to the plate portion 140 in the width direction and a pin end 133 with a pin end face 134.

The support portion 131 supports the link plate 160 such as to allow it to pivot therearound or the pivot center line C.

The pivot center line C is a center line around which the link unit 101 and the pair of link plates 160 turn or pivot relative to each other as the chain 100 engages with or disengages from the sprocket 10.

"Radial direction" and "circumferential direction" refer to the radial and circumferential directions around the pin portion 110 or the pivot center line C, respectively.

The meshing portion 121 and the stopper portion 123 of the pin portion 110 have a circular cross-sectional shape having the center on the pivot center line C at any given position in the width direction. The small-diameter part 130 has a circular cross-sectional shape having the center on the pivot center line C at any given position in the width direction.

A cross section here refers to a cross-sectional plane perpendicular to the width direction or the pivot center line C.

Referring to FIG. 1, FIG. 2, and FIG. 4, the pair of pin portions 110 (i.e., the large-diameter part 120 and the pair of small-diameter parts 130) of the link unit 101 have a pair of facing portions 111 facing each other in the longitudinal direction, and a pair of non-facing portions 112 on the opposite sides from the facing portions 111 in the longitudinal direction.

The facing portion 111 and the non-facing portion 112 are two sections of the pin portion 110 divided by a line L in a cross-sectional plane thereof at a given position in the width direction (FIG. 4), the line passing through a lowest point 120a and a highest point 120b that are two points on the outer circumferential surface 128 defining the pin height H1 of the large-diameter part 120 (i.e., the maximum width of the outer circumferential surface 128 of the large-diameter part 120 in the height direction).

In this embodiment, the lowest point 120a and the highest point 120b are intersections between the line L crossing the pivot center line C and parallel to the height direction and the outer circumferential surface 128.

The pair of facing portions 111 of the pair of pin portions 110 define a region therebetween in the longitudinal direction, i.e., a facing region that is an area having the pair of facing portions 111 as its boundaries in the longitudinal direction.

The pair of non-facing portions 112 of the pair of pin portions 110 of link units 101 adjacent each other in the longitudinal direction define a region therebetween in the longitudinal direction, i.e., a non-facing region that is an area having the pair of non-facing portions 112 as its boundaries in the longitudinal direction.

The pair of pin portions 110 and the plate portions 140 are inseparably joined together only in the facing portion 111 of each large-diameter part 120 and not in the non-facing portion 112.

Therefore, the joint part 150 exists (or is located) only in the facing portion 111 of each pin portion 110, over a range of thickness of the plate portion 140 and over the stopper portion 123 and the meshing portion 121 in the width direction, and at least partially along the circumference of the facing portion 111, or over the entire circumference of the facing portion 111 as in the present embodiment, while it does not exist (is not located) in the non-facing portion 112.

The pair of plate portions 140 are provided only between the pair of facing portions 111 in the longitudinal direction (i.e., inside the facing region) of the link unit 101.

The non-facing portions 112 are continuous with the plate portions 140 and do not have any part protruding in the longitudinal direction or radially outward from the outer circumferential surface 128.

In this way, the plate portions 140 are located entirely inside the facing region in the longitudinal direction, extending in the longitudinal direction a length equal to that of the region.

As the plate portions 140 do not exist in the non-facing region, the size of the plate portions 140 in the longitudinal direction of the chain is accordingly smaller, so that the weight of the plate portions 140 and consequently the weight of the chain 100 can be reduced.

Referring also to FIG. 3, while the stopper portions 123 protrude from the plate portions 140 by an offset amount of T in the width direction in the facing portions 111, they are in the same radial position as the meshing portion 121, i.e., coplanar with the meshing portion, in the non-facing portions 112.

Referring primarily to FIG. 4, and also to FIG. 1 as required, the pin height H1 equals to the outer diameter d1 of the large-diameter part 120, as well as to the plate height H4 of the plate portion 140.

The plate height H4 is the distance between first and second plate end faces 141 and 142 of the plate portion 140 in the height direction at a given position in the longitudinal direction between the pair of facing portions 111 in the longitudinal direction (i.e., in the facing region). The plate height H4 is set so that the plate portion 140 has required tensile rigidity to withstand the tensile force applied thereto.

In this embodiment, the plate height H4 is the same at any given position in the longitudinal direction. In other words, the maximum and minimum values of the plate height H4 are the same.

The joint height H5 of the joint part 150 in the height direction and the pin height H1 (or outer diameter d1) are from the minimum value to the maximum value of the plate height H4. Here, it is equal to the maximum value of the plate height H4.

Pin portions 110 are made as large as the joint height H4, to prevent warping of the pin portions 110 that may be caused by the tensile force, and to improve the power transmission capability of the chain 100.

The joint height H5, which determines the range of the joint part 150 in the height direction, is set at or less than the maximum value of the pin height H1.

In this embodiment, the pin height H1 is the same at any given position in the width direction, or, as differently put, the maximum and minimum values of the pin height H1 are the same, and the joint height H5 equals to the maximum value of the pin height H1 (i.e., outer diameter d1).

Therefore, as the joint part 150 has a wider joint area, the tensile stress applied to the plate portion 140 is reduced, so that the durability of the link unit 101 is improved.

Both plate end faces 141 and 142, which are the end faces of the plate portions 140 in the height direction, are flat surfaces respectively located in a pair of first and second tangent planes P1 and P2 common to the outer circumferential surface 128 over the entire length in the longitudinal direction and entirely.

The plate portions 140 thus do not protrude from the large-diameter parts 1420 in both height directions, and as the plate portions 140 are smaller in the height direction, their weight is accordingly reduced.

Figure 5:
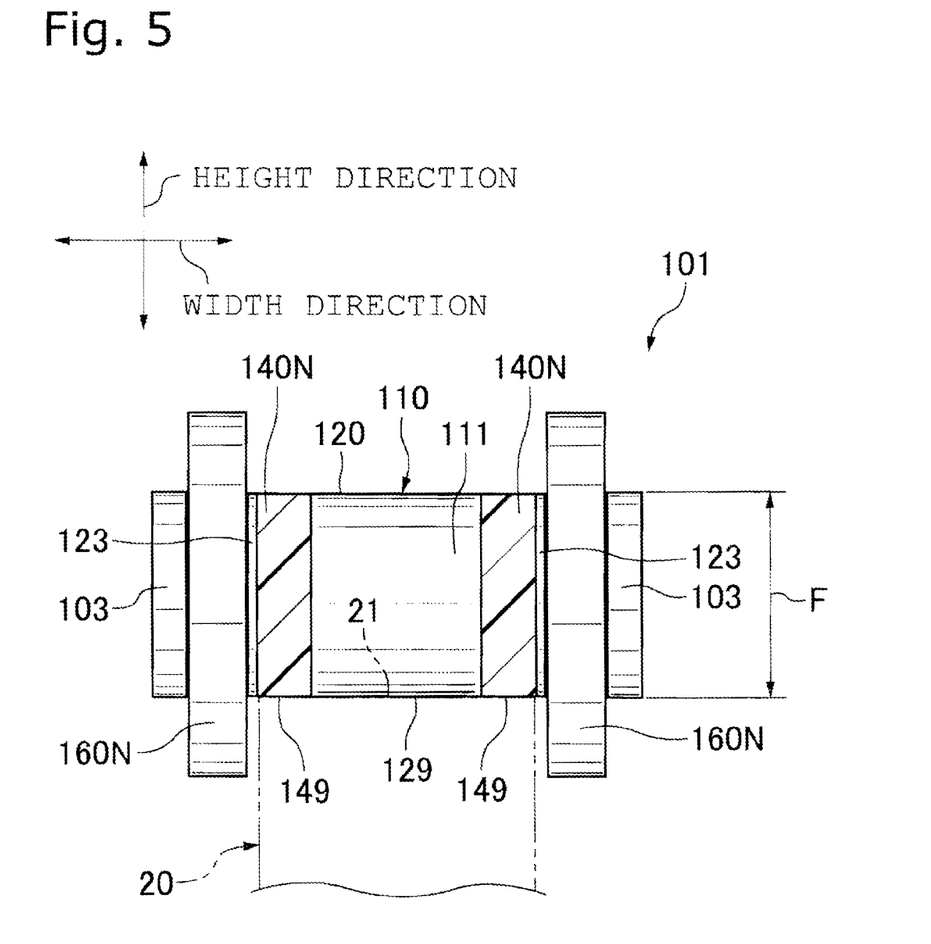
FIG. 5 is a cross-sectional view corresponding to a cross section along the line V-V of FIG. 4 for explaining how the chain slides on a chain guide.

Referring to FIG. 5, each large-diameter part 120 and each plate portion 140 of the link unit 101 have a pin sliding portion 129 and a plate sliding portion 149, respectively, which make sliding contact with a guide surface 21 of the chain guide 20.

Depending on the shape of the guide surface 21 and the running condition of the chain 100, at least one of both pin sliding portions 129 and both plate sliding portions 149 make contact with the guide surface 21 at the same time, or only both plate sliding portions 149 make contact with the guide surface 21 at the same time.

Referring to FIG. 1 to FIG. 4, the pair of planar link plates 160 of the same shape are spaced apart in the width direction and coupled to each pin portion 110 in a pivotable manner.

In this embodiment, the pair of link plates 160 are arranged on both sides of the pair of plate portions 140 in the width direction, which is to say, the pair of plate portions 140 are located in between the pair of link plates 160 in the width direction.

The link plates 160 made of a metal material are formed with a pair of pin holes 163 that are spaced apart in the longitudinal direction.

The small-diameter parts 130 are inserted into the pin holes 163 as far as to the support portions 131 so that the link plates 160 are pivotally coupled to the pin portions 110 with a loose fit (clearance fit) on the support portions 131.

The link plate 160 has a plate height H6 that is larger than the plate height H4 of the plate portion 140.

The plate height H6 is the distance between first and second plate end faces 161 and 162 of the link plate 160 in the height direction at a given position in the longitudinal direction between a pair of non-facing portions 112 adjacent each other in the longitudinal direction (or "non-facing region" as will be described later).

The plate height H6 is the same at any given position in the longitudinal direction.

With reference also to FIG. 5, the plate height H4 of the plate portion 140 in relation to the stopper portion 123 is equal to or smaller than a range F in the height direction that defines the range in which the stopper portion 123 is formed in the height direction and that is here equal to the range F in the height direction. The plate portion 140 is located within the range F in the height direction.

On the other hand, the plate height H6 of the link plate 160 is larger than the range F in the height direction, and the link plate 160 is located over a range beyond the range F in the height direction.

Referring to FIG. 2 and FIG. 4, in each link unit 101 is formed a first meshing space S1 that is surrounded only by the pair of facing portions 111 and the pair of plate portions 140 to allow a sprocket tooth 11 to come in and to go out (enter and exit).

Also formed is a second meshing space S2 that is surrounded only by the pair of non-facing portions 112 of link units 101 adjacent each other in the longitudinal direction and the pair of link plates 160 to allow a sprocket tooth 11 to come in and to go out.

As the sprocket 10 rotates, when the chain 100 meshes with the sprocket 10, each of the sprocket teeth 11 enters into each of the first and second meshing spaces S1 and S2 of the chain 100 that are alternately arranged in the longitudinal direction one by one. As the chain 100 disengages from the sprocket 10, the sprocket teeth 11 exit the meshing spaces one at a time.

Referring to FIG. 1 to FIG. 3 and FIG. 5, the chain 100 includes a plurality of caps 103 abutting on the link plates 160 as retainers to stop the link plates 160 from coming off of the pin portions 110.

Pairs of caps 103 are provided on pairs of pin ends 133 of the respective small-diameter parts 130 for each of the pair of link plates 160 supported on both support portions 131.

The caps 103 are fixedly attached to the pin ends 133 such as to cover the pin end faces 134 by press fitting as one means of secure attachment.

To assemble the chain 100, first, both small-diameter parts 130 of the pin portions 110 of the link unit 101 are inserted into the pin holes 163, so that the pair of link plates 160 are loosely fitted on the support portions 131.

The caps 103 are then attached to the respective pin ends 133 to retain the link plates 160.

Through the same assembling steps, the chain 100 is formed by link units 101 and pairs of link plates 160 coupled together alternately in the longitudinal direction.

When the chain 100 is subjected to tension, the pin portions 110 transmit the tensile force to the plate portions 140 in the facing region only through the respective joint parts 150.

The joint parts 150 are subjected to tensile stress.

This tensile stress is reduced by making the pin height H1 or outer diameter d1 larger.

The pin portions 110 transmit the tensile force as pressing force to the link plates 160 in the facing region through the respective small-diameter parts 130.

Next, the effects of the embodiment configured as described above will be explained.

The chain 100 is formed by alternately and pivotally coupling together link units 101 and pairs of link plates 160 in the longitudinal direction, and placed over a plurality of sprockets 10 that form a sprocket mechanism.

Thus, the chain 100, which is formed by alternately and pivotally coupling together link units 101 and pairs of link plates 160 in the longitudinal direction, as it passes over the plurality of sprockets 10, can transmit power to and from the sprockets 10.

The link unit 101 is formed by a pair of pin portions 110 and a pair of plate portions 140 that couple together the pair of pin portions 110 at a pair of joint parts 150. The pin portions 110 apply the tensile force as pulling force to the plate portions 140 via the joint parts 150 that are located in the facing portions 111. The pair of link plates 160 are pivotally coupled to the pin portions 110 such as to sandwich the pair of plate portions 140 in the width direction.

As the pin portions 110 apply the tensile force as pulling force to the plate portions 140 via the joint parts 150 in the facing region, the tensile stress generated in part of the plate portions 140 surrounding the pin portions 110 is dispersed over the joint parts 150, which prevents stress concentration at boundary portions A (see FIG. 4) around the boundaries B (see FIG. 4) between the facing regions and the non-facing regions.

The plate portions 140 of the link unit 101 can thus have improved fatigue strength, whereby the durability of the link unit 101, and consequently the durability of the chain 100, is improved.

To assemble the chain 100, it is only necessary to couple a pair of link plates 160 pivotally to a link unit 101, which is a single component having a pair of pin portions 110 and a pair of plate portions 140 integrally formed, so that, as compared to conventional chains formed by press-fitting a pair of connecting pins to a pair of outer link plates, the chain 100 can be assembled more easily, and the improved ease of assembly enables cost reduction.

Since the link plates 160 are coupled to the pin portions 110 that are integral with the plate portions 140, the link unit 101 and a pair of link plates 160 are coupled together with a fewer number of components as compared to conventional chains that require coupling pins and bushings, which also contributes to cost reduction.

The stopper portion 123 is located within the range E in the width direction between the adjoining plate portion 140N and the adjoining link plate 160N adjoining each other in the width direction to provide restriction to stop the adjoining link plate 160N from coming closer to the adjoining plate portion 140N, so that there is formed a gap G in the width direction between the facing portions 140g and 160g of the adjoining plate portion 140N and the adjoining link plate 160N.

The stopper portion 123 thus restricts contact between the adjoining plate portion 140N and the adjoining link plate 160N, so that the contact area between the link unit 101 and the link plate 160 is reduced as compared to if there is no stopper portion 123. Therefore, friction resistance between the link unit 101 and the link plate 160 that are pivotable around the pivot center line C relative to each other and slide on each other when the chain 100 bends is reduced, which in turn reduces the power loss in the chain 100 when it is running by the power generated by the power source (such as engine or motor). The power transmission performance of the chain 100 can thus be improved.

First meshing spaces S1 surrounded by the pairs of large-diameter parts 120 and pairs of plate portions 140 of the link units 101, and second meshing spaces S2 surrounded by the pairs of large-diameter parts 120 of the link units 101 adjacent each other in the longitudinal direction and the pairs of link plates 160, are alternately formed in the longitudinal direction. Each of the sprocket teeth 11 of the sprocket 10 can enter each of the first meshing spaces and the second meshing spaces S1 and S2 one after another.

With the chain 100 passing over the sprocket 10, as the sprocket 10 rotates, the sprocket teeth 11 enter the first and second meshing spaces S1 and S2. When power is transmitted between the chain 100 and the sprocket 10, the power transmission occurs between the chain 100 and the sprocket teeth 11 through the link units 101 of the chain 100, where pin portions 110 and plate portions 140 are inseparably joined so that there is no gap between the pin portions 110 and plate portions 140. This configuration prevents the occurrence of relative displacement between these components. Thus, noise resulting from such relative displacement is prevented and the chain 100 can exhibit improved low noise performance.

The stopper portion 123 is part of the pin portion 110. The link plate 160 is loosely fitted on the support portions 131 that are passed through the pin holes of the link plate. The stopper portion 123 has an outer diameter d12 larger than the hole diameter d6 of the pin holes 163. The plate portion 140 is located within a range F in the height direction of the stopper portion 123.

Therefore, even if the adjoining link plate 160N has a larger plate height than that of the plate portion 140, an amount of offset T of the stopper portion 123, which is an element that contributes to restrict contact between the adjoining plate portion 140N and the adjoining link plate 160N when the adjoining link plate 160N loosely fitted on the support portions 131 is tilted around an axis in the longitudinal direction, can be made small in the width direction from the adjoining plate portion 140N. Thus the chain 100 can be made small in the width direction.

The pin portion 110 includes a large-diameter part 120 that is continuous in the width direction, and a pair of small-diameter parts 130 on both sides of the large-diameter part 120 in the width direction with a smaller outer diameter d2 than the outer diameter d1 of the large-diameter part 120. The large-diameter part 120 forms the stopper portions 123 and the meshing portion 121 located between the pair of plate portions 140 in the width direction to mesh with the sprocket teeth, while the small-diameter parts 130 each form the respective support portions 131. The joint parts 150 range over the stopper portions 123 and the meshing portion 121.

Therefore, in the pin portion 110 formed by the large-diameter part 120 and the small-diameter parts 130, as the joint parts 150 are formed to range over the meshing portion 121 and the stopper portions 123 that are formed by the large-diameter part 120, the meshing portion 121 can have higher rigidity, as it is formed by the large-diameter part 120, as well as the tensile stress at the joint parts 150 can be reduced as they are formed over a large area. Thus the fatigue strength of the link unit can be increased, which in turn improves the durability of the chain 100.

The plate portions 140 are located only between a pair of facing portions 111 in the longitudinal direction, so that the joint parts 150 are located only in the pair of facing portions 111 of the large-diameter parts 120 of the pin portions 110.

Since the plate portions 140 do not exist in the non-facing region, or the second meshing space S2, which is outside the pair of facing portions 111 in the longitudinal direction, in the event that pin portions 110 suffer warping due to the tensile force, the plate portions 140 will not contact the sprocket teeth 11, which would occur if the plate portions 140 existed also in the non-facing region. Thus, noise, wear, and friction resistance caused by such contact are reduced, so that the chain 100 can exhibit improved low noise performance, and better durability and power transmission capability.

As the plate portions 140 do not exist in the non-facing region, the size of the plate portions 140 in the longitudinal direction is accordingly smaller, so that the weight of the plate portions 140 and consequently the weight of the chain 100, can be reduced.

The pair of large-diameter parts 120 and the pair of plate portions 140 each have pin sliding portions 129 and plate sliding portions 149 that slide against the guide surface 21 of the chain guide 20, respectively.

In the link unit 101, therefore, the large-diameter parts 120 of the pair of pin portions 110 slide against the guide surface 21 in addition to the pair of plate portions 140, so that, as compared to a case where only the pair of plate portions 140 slide against the guide surface 21, the plate portions 140 make sliding contact with the guide surface 21 less frequently because of the large-diameter parts 120 also sliding on the guide surface 21, or, the contact pressure on the guide surface 21 is reduced due to both of the plate portions 140 and pin portions 110 making sliding contact therewith. Thus, wear of the plate portions 140 is reduced, so that the durability of the plate portions 140 and consequently the durability of the chain 100, is improved.

Below, an alternative embodiment will be described, with respect to changes made to part of the structure of the previously described embodiment.

The meshing portion 121 and the stopper portion 123 of the large-diameter part 120 may have different outer diameters d11 and d12.

The outer diameter d21 of the support portion 131 may be larger than the outer diameter d11 of the meshing portion 121.

The outer diameter d21 of the stopper portion 123 may be circumferentially partially larger than the hole diameter d6 of the pin hole 163.

The stopper portion 123 may be separated from the plate portion 140 in the width direction.

Retainers may be formed by plastically deforming the pin ends 133 instead of using the caps 103.

What is claimed is:

1. A chain formed by a plurality of inner links and outer links alternately and pivotally coupled together in a longitudinal direction, and placed over a sprocket,
   the inner links each being formed as a link unit having a pair of connecting pin portions spaced apart in the longitudinal direction and a pair of plate portions coupling the pair of connecting pin portions and spaced apart in a width direction,
   the plate portions coupling together the pair of connecting pin portions at a pair of joint parts where the pair of connecting pin portions and the plate portions are inseparably joined together,
   the outer links each being formed by a pair of link plates,
   the pair of link plates sandwiching the pair of plate portions in the width direction and being pivotally coupled to a pair of support portions of the connecting pin portions,
   the chain further having:
   a stopper portion located within a range in the width direction between an adjoining plate portion and an adjoining link plate that are the plate portion and the link plate adjoining each other in the width direction to establish a restriction state of restricting the adjoining link plate from coming closer to the adjoining plate portion, and
   a gap in the width direction being formed between facing portions of the adjoining plate portion and the adjoining link plate facing each other in the width direction in the restriction state.

2. The chain according to claim 1, wherein
   the pair of connecting pin portions have a pair of facing portions facing each other in the longitudinal direction and a pair of non-facing portions opposite the pair of facing portions in the longitudinal direction,
   the connecting pin portions applying a tensile force to the plate portions via the pairs of joint parts each located in the pair of facing portions, and wherein
   first meshing spaces surrounded by the pairs of connecting pin portions and the pairs of plate portions of the link units, and second meshing spaces surrounded by the connecting pin portions of the link units adjacent each other in the longitudinal direction and the pairs of link plates, are alternately formed in the longitudinal direction, such that
   a plurality of sprocket teeth of the sprocket enter consecutively the first meshing spaces and second meshing spaces respectively.

3. The chain according to claim 1, wherein
   the stopper portion is part of the connecting pin portion,
   the link plates are loosely fitted on the support portions that are passed through pin holes of the link plates,
   the stopper portion has an outer diameter larger than a hole diameter of the pin holes, and
   the plate portion is located within a range in a height direction of the stopper portion.

4. The chain according to claim 1, wherein
   the connecting pin portions each include a large-diameter part continuous in the width direction and a pair of small-diameter parts on both sides of the large-diameter part in the width direction with a smaller outer diameter than an outer diameter of the large-diameter part,
   the large-diameter part forms the stopper portion and a meshing portion located between the pair of plate portions in the width direction to be able to mesh with the sprocket teeth, and
   the small-diameter parts form the support parts, the joint parts each ranging over the stopper portion and the meshing portion.

* * * * *